US008528735B2

(12) United States Patent (10) Patent No.: US 8,528,735 B2
Nies (45) Date of Patent: Sep. 10, 2013

(54) TRANSPORT FRAME FOR NACELLE/ROTOR HUB UNIT OF A WIND TURBINE, METHOD OF TRANSPORTING AND MOUNTING A NACELLE/ROTOR HUB UNIT

(75) Inventor: Jacob Johannes Nies, HA Zwolle (NL)

(73) Assignee: General Electric Company, Schenectady, NY (US)

( * ) Notice: Subject to any disclaimer, the term of this patent is extended or adjusted under 35 U.S.C. 154(b) by 421 days.

(21) Appl. No.: 13/075,742

(22) Filed: Mar. 30, 2011

(65) Prior Publication Data

US 2011/0220538 A1 Sep. 15, 2011

(51) Int. Cl.
  *B65D 85/00* (2006.01)
(52) U.S. Cl.
  USPC .............. 206/521; 206/525; 410/2; 414/800; 248/671
(58) Field of Classification Search
  USPC ............ 206/521, 583, 525; 410/2; 248/671, 248/674, 675, 678; 414/800
  See application file for complete search history.

(56) References Cited

U.S. PATENT DOCUMENTS

| 8,096,051 B2* | 1/2012 | Storgaard Pedersen ... 29/889.21 |
| 2008/0257844 A1* | 10/2008 | Llorente Gonzalez et al. ............................ 212/179 |
| 2008/0296197 A1* | 12/2008 | Kootstra ........................ 206/525 |
| 2009/0120830 A1* | 5/2009 | Livingston .................... 206/523 |
| 2011/0132239 A1* | 6/2011 | Poulsen et al. ............... 108/55.1 |
| 2011/0304122 A1* | 12/2011 | Poulsen ........................ 280/404 |
| 2012/0195768 A1* | 8/2012 | Van Nood et al. ........ 416/244 R |
| 2012/0201636 A1* | 8/2012 | Pedersen ...................... 414/539 |

* cited by examiner

*Primary Examiner* — Jacob K Ackun
(74) *Attorney, Agent, or Firm* — Global Patent Operation; Douglas D. Zhang (57) ABSTRACT

A transport frame for a nacelle/rotor hub unit of a wind turbine is provided, wherein the unit comprises a wind turbine nacelle and a wind turbine rotor hub mounted to the nacelle, the transport frame comprising a main beam for supporting the weight of the nacelle/rotor hub unit; first and second lateral stabilization elements; a holding fixture for fixing the nacelle/rotor hub unit to the transport frame; a first attachment point for a lifting appliance, the first attachment point being provided at a first end of the main beam; a second attachment point for the lifting appliance, the second attachment point being provided at the first lateral stabilization element; and a third attachment point for the lifting appliance, the third attachment point being provided at the second lateral stabilization element.

15 Claims, 9 Drawing Sheets

TRANSPORT FRAME FOR NACELLE/ROTOR HUB UNIT OF A WIND TURBINE, METHOD OF TRANSPORTING AND MOUNTING A NACELLE/ROTOR HUB UNIT

BACKGROUND OF THE INVENTION

The subject matter described herein relates generally to methods and systems for transporting and mounting of wind turbine rotor hubs, and more particularly, to methods and systems for transporting and mounting wind turbine rotor hubs for offshore or nearshore wind turbines.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generator to generate electricity.

As the size of wind turbines, in particular, the length of the tower and the rotor blades, increased in recent years, transportation and mounting of wind turbine components becomes more difficult. The problem of transportation and mounting of wind turbine components is particularly complex in the case of offshore sites where wind turbines are erected in water, e.g. in the sea or in a lake. In view of this and other problems, improved devices and methods for transporting and mounting wind turbines are desirable.

BRIEF DESCRIPTION OF THE INVENTION

In one aspect, a transport frame for a nacelle/rotor hub unit of a wind turbine is provided, wherein the unit includes a wind turbine nacelle and a wind turbine rotor hub mounted to the nacelle. The transport frame includes a main beam for supporting the weight of the nacelle/rotor hub unit; first and second lateral stabilization elements; a holding fixture for fixing the nacelle/rotor hub unit to the transport frame; a first attachment point for a lifting appliance, the first attachment point being provided at a first end of the main beam; a second attachment point for the lifting appliance, the second attachment point being provided at the first lateral stabilization element; and a third attachment point for the lifting appliance, the third attachment point being provided at the second lateral stabilization element.

In another aspect, a method for transporting a nacelle/rotor hub unit of a wind turbine is provided, wherein the unit includes a wind turbine nacelle and a wind turbine rotor hub mounted to the nacelle. The transport method includes providing a transport frame for the nacelle/rotor hub unit; bringing the transport frame into a loading position in which the nacelle/rotor hub unit can be mounted to the transport frame; mounting a nacelle/rotor hub unit to the transport frame; bringing the transport frame into a transport position in which the nacelle/rotor hub unit; and, transporting the nacelle/rotor hub unit with a vehicle to an erection site of a wind turbine.

In yet another aspect, a method for mounting a nacelle/rotor hub unit of a wind turbine to the tower top of a wind turbine tower is provided, wherein the unit includes a wind turbine nacelle and a wind turbine rotor hub mounted to the nacelle. The mounting method includes mounting the nacelle/rotor hub unit to a transport frame; transporting to the nacelle/rotor hub unit on the transport frame to an erection site of a wind turbine; lifting the nacelle/rotor hub unit on the transport frame from a transport vehicle; removing the transport frame while the nacelle/rotor hub unit is lifted; lowering the nacelle/rotor hub unit onto the tower top; and installing the nacelle/rotor hub unit at the tower top.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a transport frame for a nacelle/rotor hub unit of a wind turbine. More specifically, the transport frame is adapted to support a fully or partially pre-assembled nacelle/rotor hub unit during transportation. In some embodiments, this includes nacelle/rotor hub units in which one or more rotor blades have already been mounted to the rotor hub. In addition, the transport frame may also facilitate mounting of the nacelle/rotor hub unit to the top of a tower.

As used herein, the term nacelle/rotor hub unit is intended to be representative of a unit which is formed from a wind turbine nacelle and a wind turbine rotor hub which are already assembled, i.e. connected. The term nacelle/rotor hub unit includes units with and without one or more rotor blades mounted to the hub. As used herein, the term transport assembly is intended to be representative of an assembly formed by mounting a nacelle/rotor hub unit to a transport frame as described below. As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Figure 1:
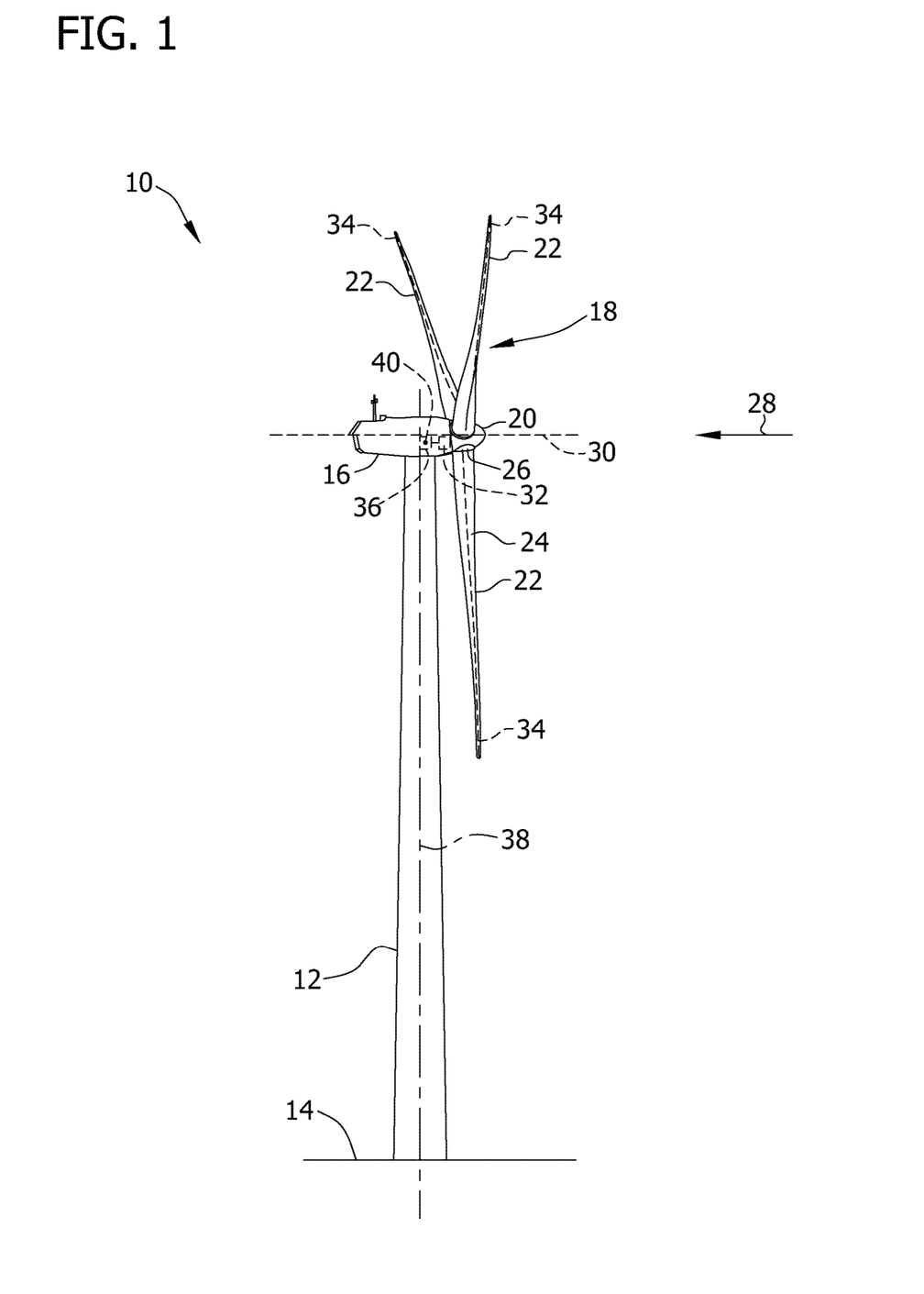
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Figure 2:
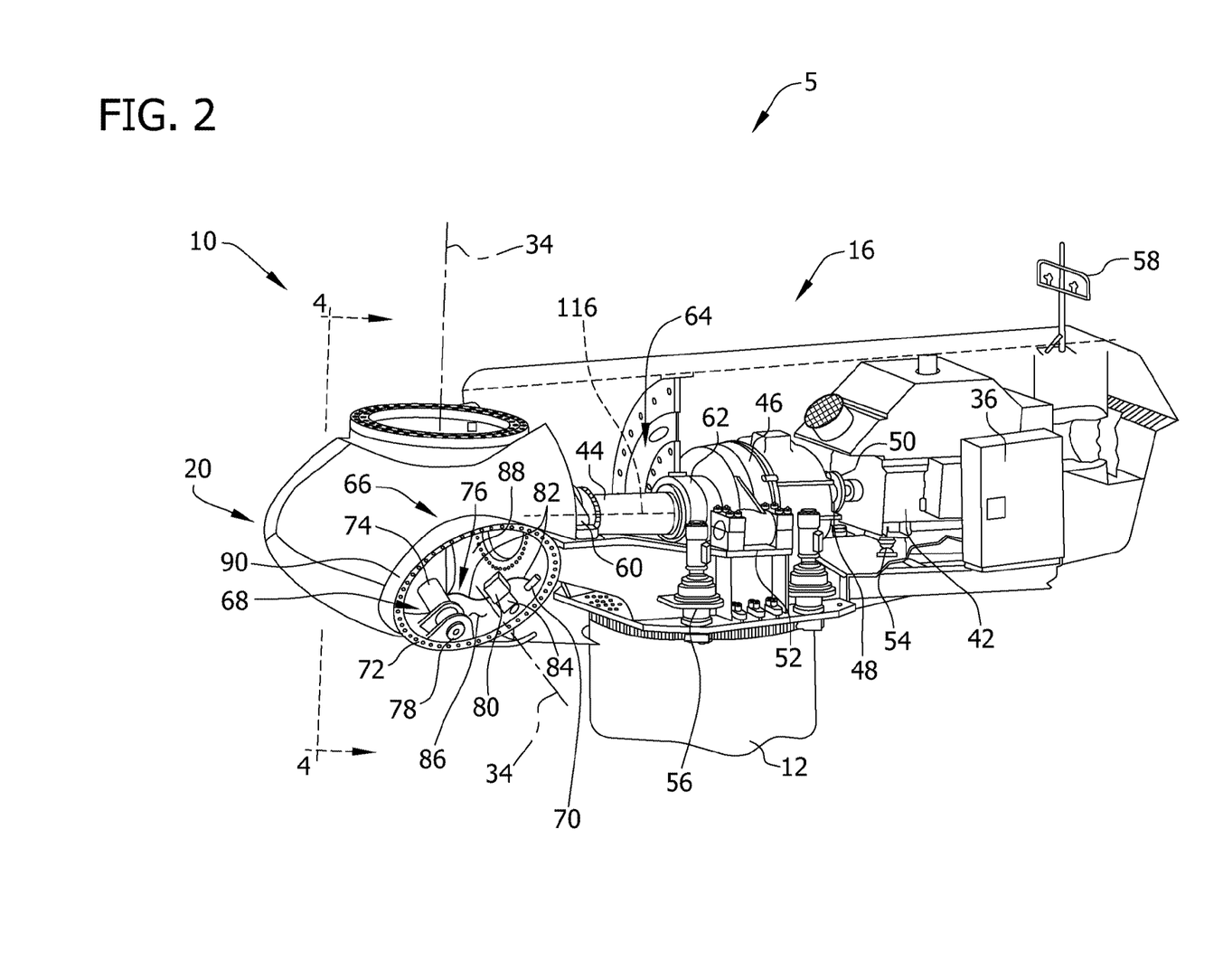
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16 to form a nacelle/rotor hub unit 5. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. However, for transporting nacelle/rotor hub unit 5 it is not required that the rotatable connection between generator 42 and rotor hub 20 is already established. For transportation purposes, it may be sufficient if rotor hub 20 is coupled to nacelle 16 via rotor shaft 44. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

Figure 3:
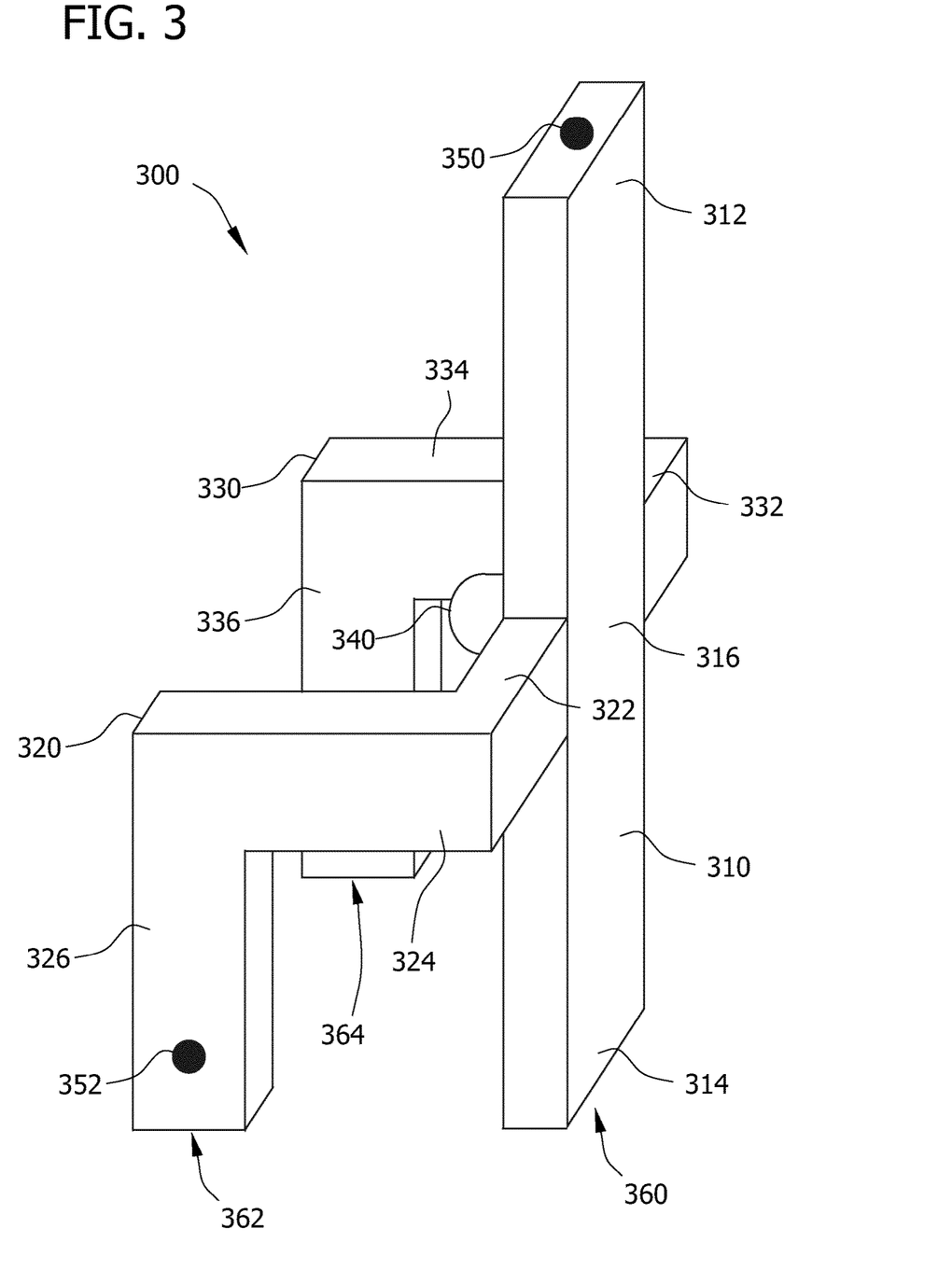
FIG. 3 is a perspective view of a transport frame according to an embodiment described herein.

FIG. 3 is a perspective view of a transport frame 300 according to an embodiment. Transport frame 300 is adapted for receiving a nacelle/rotor hub unit 5 of a wind turbine, wherein the unit 5 comprises a wind turbine nacelle 16 and a wind turbine rotor hub 16 which is already mounted to the nacelle 16. Transport frame 300 includes a main beam 310 for supporting the weight of the nacelle/rotor hub unit 5 when being transported. Typically, main beam 310 will be made of a high-strength material like steel, but may also be made of lightweight materials including but not being limited to titanium, titanium alloys, aluminum, aluminum alloys and the like. Main beam 310 has a first end 312 and a second end 314 opposite to the first end 312.

In a center portion 316 of main beam 310, first and second lateral stabilization elements 320, 330 are provided. Typically, lateral stabilization elements 320, 330 are made of the same material as main beam 310, but in some embodiments may also be made of different material. In some embodiments, lateral stabilization elements 320, 330 are made of lighter material to save weight. In some embodiments, the load on lateral stabilization elements 320, 330 may not be as high as on main beam 310 so that lighter but less rigid material may be used. In other embodiments, the load on lateral stabilization elements 320, 330 may be similar or even higher than the load on main beam 310. In the embodiment shown in FIG. 3, the lateral stabilization elements have first sections 322, 332 joined to the main beam 310 in the center portion 316 thereof. First sections 322, 332 may be attached to main beam 310, e.g. by welding, or may be integrally formed with main beam 310. First sections 322, 332 extend substantially perpendicular to main beam 310 and, together with main beam 310, defining a plane on which transport frame 310 may be supported. In other embodiments, first sections 322, 332 may have an angle different than 90 degrees with respect to main beam 310. Lateral stabilization elements 320, 330 further have second sections 324, 334 which extend substantially perpendicular to the main beam 310 and to the plane spanned by main beam 310 and first sections 322, 332. Second sections 324, 334 also extend substantially perpendicular to first sections 322, 332, respectively. However, in other embodiments second sections 324, 334 may have angles different than 90 degrees with respect to the main beam 310 and/or the first sections 322, 332. Lateral stabilization elements 320, 330 further include third sections which extend generally parallel to main beam 310 in a plane parallel to the plane defined by main beam 310 and first sections 322, 332. As can be seen in FIG. 3, first and second stabilization elements 320, 330 are basically L-shaped and transport frame 300 has a chair-like appearance.

Furthermore, transport frame 300 includes a holding fixture 340 which is adapted for fixing the nacelle/rotor hub unit 5 to the transport frame 5. Typically, holding fixture 340 is provided at a location of main beam 310 where the first and second lateral stabilization elements 320, 330 are joined to the main beam, e.g. center portion 316 in the embodiment shown in FIG. 3. Typically, a yaw bearing or a yaw bearing opening is available at this position and provides sufficient load capability to hold the nacelle/rotor hub unit at the transport frame. Furthermore, holding fixture 340 is located at or near the center of gravity of the transport assembly in which the nacelle/rotor hub unit 5 is mounted to the transport frame. In the embodiment shown in FIG. 3, holding fixture 340 includes a protrusion insertable into a yaw bearing opening of the nacelle/rotor hub unit 5. In other embodiments, holding fixture 340 includes a flat flange which is connected to the yaw bearing. In still further embodiments, holding fixture 340 includes a ring around the yaw bearing for attaching the nacelle/rotor hub unit to the transport frame, in particular if the yaw bearing protrudes from the lower surface of the nacelle. Furthermore, the nacelle may temporarily rest on legs before and/or during it is assembled with the rotor hub to form the nacelle/rotor hub unit. The legs are mounted to coupling connectors (not shown) arranged around the yaw bearing opening on the lower surface of the nacelle. After removal of the legs, these coupling connectors may also be utilized to mount the nacelle to the transport frame. According to embodiments of the present invention, the coupling connectors may be snap-on joints and/or quick-release joints. In another embodiment (not shown), holding fixture 340 includes a ring surrounding the yaw bearing of the nacelle/rotor hub unit 5, wherein the ring can be attached to the yaw bearing. In typical embodiments, holding fixture 340 is adapted to make a connection to the nacelle on or around the yaw system.

Furthermore, transport frame 300 includes at least three attachment points for lifting appliances. A first attachment point 350 for the lifting appliance is provided at the first end 312 of main beam 310, for example the front surface of main beam 310. A second attachment point 352 for the lifting appliance is provided at the first lateral stabilization element 320. In the embodiment shown in FIG. 3, second attachment point 352 is located at a lower end of the third section 326 of first lateral stabilization element 320. A third attachment point for the lifting appliance is provided at the second lateral stabilization element 330 at a position opposite to second attachment point 352. Therefore, it cannot be seen in the perspective view of FIG. 3. The attachment points 350, 352 are designed to resist high loads. In particular, attachment points 350, 352 are configured such that they can hold the weight transport frame 300 with the nacelle/rotor hub unit 5 mounted thereto. Furthermore, the attachment points 350, 352 are arranged so that the center of gravity of the transport assembly with the nacelle/rotor hub unit 5 on transport frame 300 is located between first attachment point 350 and the second and third attachment points. Although only three attachment points have been described above, more than three attachment points may be used when applicable. In general, attachment points of the transport frame will be arranged such that the center of gravity of the transport assembly will be located between at least three of the attachment points in any position of the transport frame. Thus, it is ensured that the transport frame is stable during loading, transport, and installation.

As it is shown in FIG. 3, transport frame 300 is symmetric with respect to a longitudinal axis extending through main beam 310 and first attachment point 350. Thus, imbalances can be reduced or avoided while transport frame 310 with unit 5 attached thereto is lifted.

Furthermore, transport frame 300 has at least two different positions, a loading position and a transport position. In a loading position, the back surface of main beam 310 (i.e. the surface opposite to the surface on which holding fixture 340 is provided) is horizontal and, typically, lying flat on the ground. The back surfaces of first sections 322, 332 of the first and second lateral stabilization elements 320, 330 are also in a horizontal position. Thus, the first and second lateral stabilization elements 320, 330 together with main beam 310 define at least three support points, in particular a cross-shaped area in the embodiment shown in FIG. 3, on which transport frame 310 is supported on the ground. In this position, lateral stabilization elements 320, 330 define an interior space therebetween in which a nacelle/rotor hub unit 5 may be accommodated.

In a transport position, main beam 310 is oriented substantially perpendicular to the ground, for example as shown in FIG. 3. Also, the end faces of third sections 326, 336 are touching the ground, so that main beam 310 and first and second lateral stabilization elements 320, 330 define at least three support points, or support faces, 360, 362, 364 when transport frame 300 is in the transport position. As will be explained later, the nacelle/rotor hub unit 5 is in an upright position with its rotor axis 30 being substantially vertical when transport frame 300 is in the transport position. The weight of the nacelle/rotor hub unit 5 is substantially supported by holding fixture 340, main beam 310, and first and second lateral stabilization elements 320, 330. In general, a transport frame according to embodiments of the present invention is configured such that it will provide at least three support points, wherein the support points will be arranged such that the center of gravity of the transport assembly will be located between the support points in any position of the transport frame. Thus, it is ensured that the transport frame is stable in loading and in transport position. Furthermore, the connectors and/or beams extending between the support points are typically arranged so that they do not interfere with the nacelle/rotor hub unit, a tower on which the nacelle/rotor hub unit is installed, and the lifting appliances used to move the transport frame.

Figure 4:
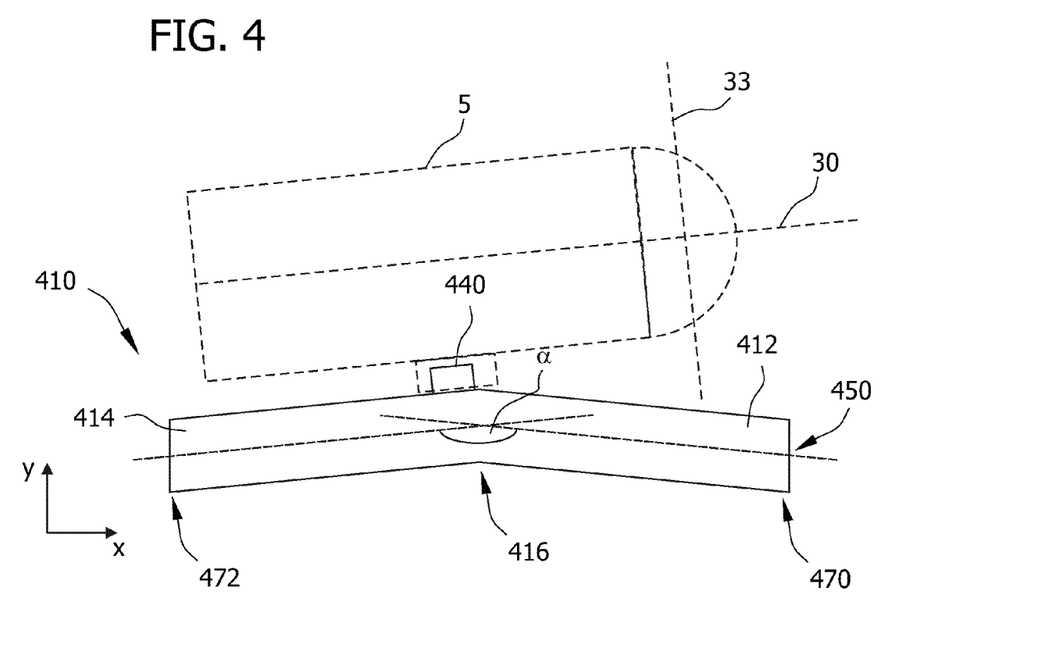
FIG. 4 is a side view of a main beam according to another embodiment described herein.

FIG. 4 is a side view of a main beam 410 of a transport frame according to another embodiment. In order to facilitate understanding, the lateral stabilization elements are not shown in FIG. 4. Main beam 410 has first and second sections 412, 414 which are angled at an angle α with respect to each other. Thus, center portion 416 of main beam 410 is elevated if main beam 410 is in the horizontal position as shown in FIG. 4. Accordingly, main beam 410 it is not supported on its full back surface but only at support lines 470, 472 at the ends of first and second sections 412, 414 which may be advantageous if the ground on which main beam 410 rests is uneven. Furthermore, holding fixture 440 is located on second section 414 and, thus, forms an angle to the horizontal axis x although being perpendicular to the surface of main beam 410. Due to the angular configuration of main beam 410, also a nacelle/rotor hub unit 5 (shown in broken lines) mounted thereto will exhibit a slight tilt to the horizontal axis x. As a result, the rotor axis 30 of a nacelle/rotor hub unit 5 mounted to main beam 410 will not be exactly horizontal but angled with respect to the horizontal axis x. Furthermore, a rotor blade plane 33 will also be tilted but with respect to the vertical axis y. If later brought into transport position, rotor axis 30 will exhibit a tilt with respect to vertical axis y and rotor blade plane 33 will exhibit a tilt with respect to horizontal axis x. In other embodiments, holding fixture may be located on first section 412 and, therefore, the tilt of rotor axis 30 and rotor blade plane 33 will be different. In alternative embodiments (not shown), the main beam is straight but little feet are attached to its back surface in order to define the contact lines.

Figure 5:
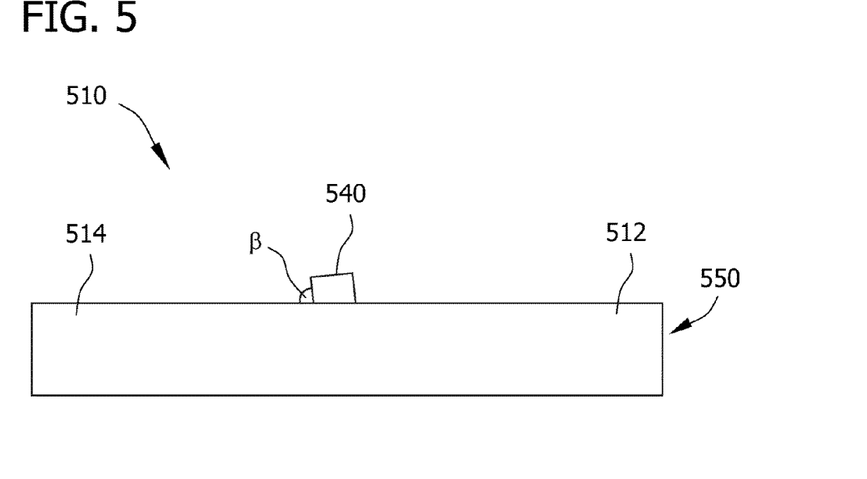
FIG. 5 is a side view of a main beam according to a different embodiment described herein.

FIG. 5 is a side view of a main beam 510 of a transport frame according to another embodiment. In order to facilitate understanding, the lateral stabilization elements are not shown in FIG. 5. In this embodiment, main beam 510 is not angled but holding fixture 540 includes an angle β of less than 90 degrees with respect to the main beam. Typically, the angle β is in the range of 89 to 60 degrees, typically 87 to 65 degrees, more typically 75 to 70 degrees. In other embodiments, holding fixture 540 includes an angle β of more than 90 degrees with respect to the main beam. For example, the angle β may be in the range of 91 to 120 degrees, typically 93 to 115 degrees, more typically 105 to 110 degrees. Similar to the embodiment shown in FIG. 4, the tilt of holding fixture 540 results in a tilt of the rotor blade plane of the nacelle/rotor hub unit with respect to the ground when the transport frame is in the loading position.

In addition to the above embodiments, a tilt of the rotor blade plane with respect to the ground may also be achieved when the main beam and the holding fixture are not angular with respect to each other and/or to the horizontal and/or vertical axis. In particular, in some wind turbines the rotor axis forms an angle of, for example, 7 degrees with the horizontal axis so that the rotor blade plane is tilted with respect to the vertical axis in operating condition of the wind turbine. Thus, it can be avoided that the rotor blades hit the tower during operation even if the blades bend towards the tower under the wind load. For a nacelle/rotor hub unit of the foregoing design, a tilt of the rotor axis and/or the rotor blade plane will occur automatically when mounted to a transport frame even if the main beam and/or the holding fixture are not angular with respect to the horizontal and/or vertical axis. The reason for providing a tilt of the rotor blade plane will be explained in more detail with respect to FIGS. 9 and 10 below.

Figure 6:
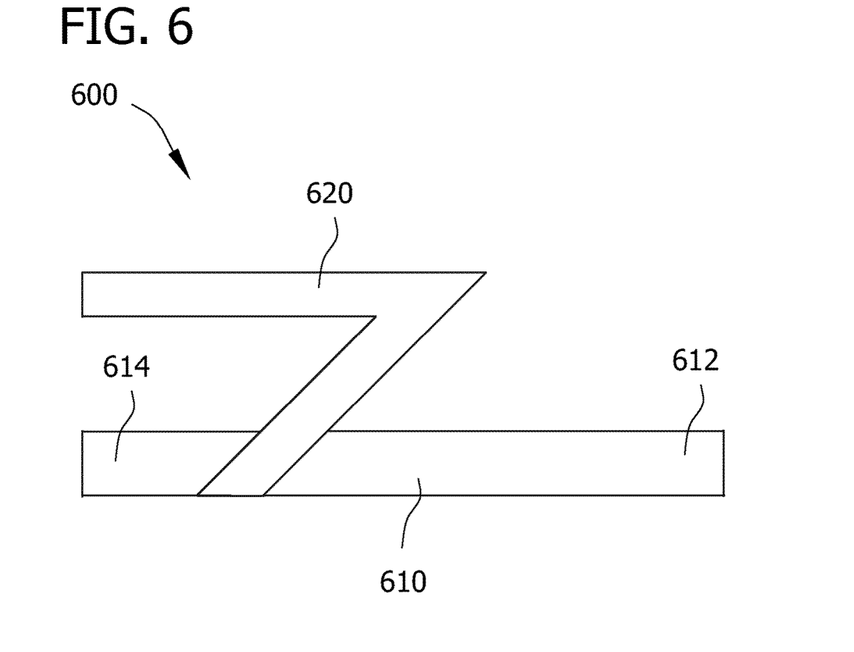
FIG. 6 is a side view of a transport frame according to another embodiment described herein.

FIG. 6 is a side view of a transport frame 600 according to another embodiment. In this embodiment, the lateral stabilization elements 620 are of a general V-shape.

Figure 7:
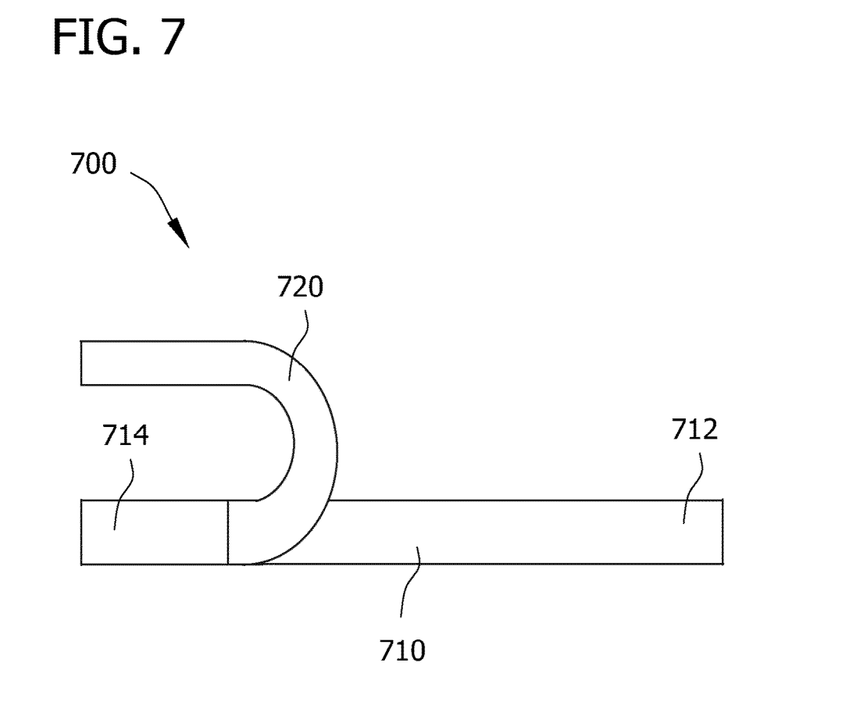
FIG. 7 is a side view of a transport frame according to a different embodiment described herein.

FIG. 7 is a side view of a transport frame 700 according to a different embodiment. In this embodiment, the lateral stabilization elements 720 are of a general C-shape.

Figure 8:
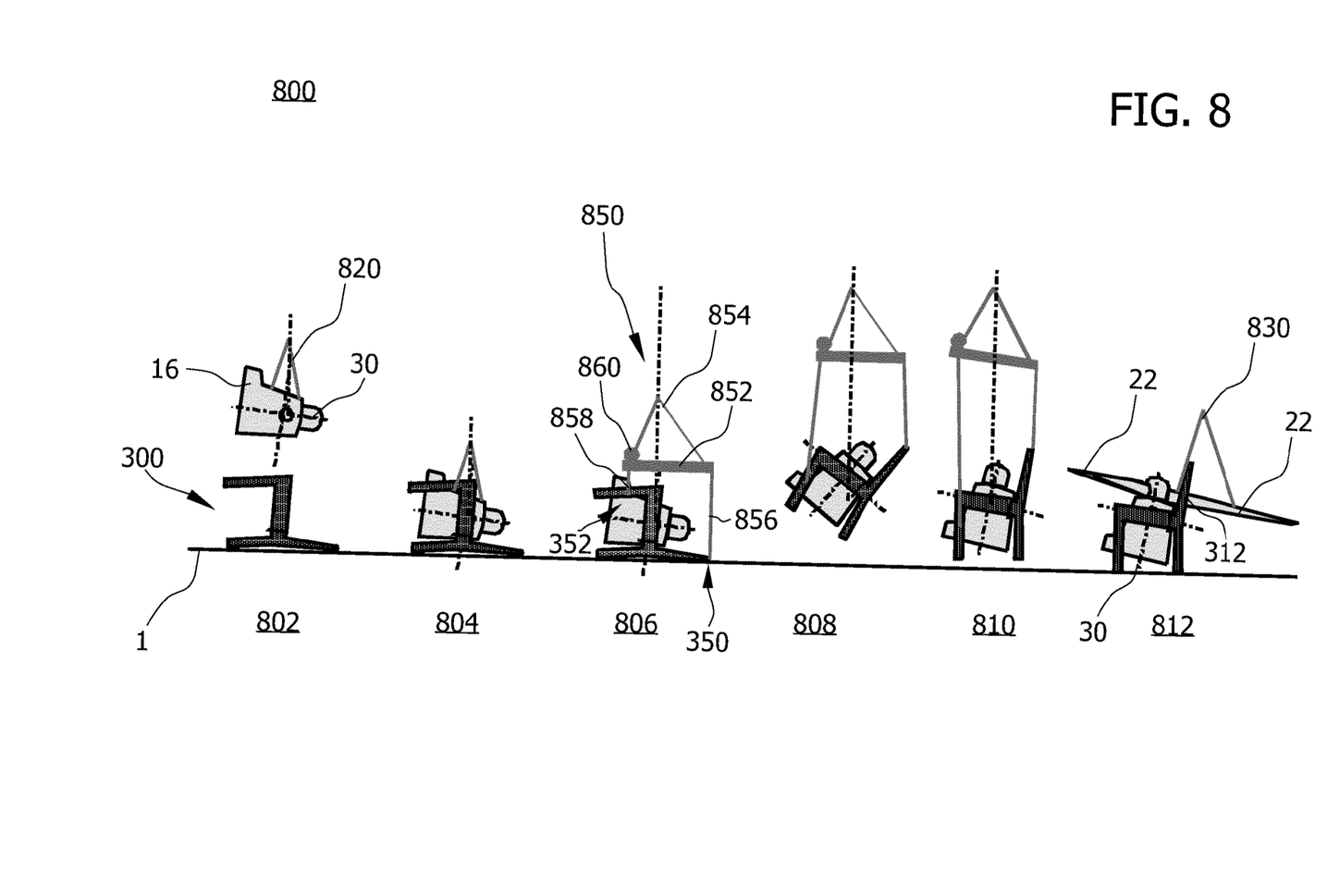
FIG. 8 shows method steps of a method according to an embodiment described herein.

FIG. 8 shows method steps of a method 800 according to an embodiment described herein. In a first step 802, transport frame 300 is put onto the ground in the transport position. With a lifting appliance 820, an already assembled nacelle/rotor hub unit is lowered into the space formed between the lateral stabilization elements (action 804). The rotor hub 20 is facing towards the first end of the main beam and the rear end of the nacelle 16 is facing towards the second end of the main beam. The nacelle 16 has a yaw bearing opening on its lower surface (not shown) into which the holding fixture of transport frame 300 is inserted (step 804). In the condition shown in step 804, the nacelle/rotor hub unit is mounted to transport frame 300 by fixing the holding fixture to the nacelle.

In the following steps 806 to 810, a further lifting gear 850 is used to bring the transport assembly, i.e. the nacelle/rotor hub unit together with the transport frame, into transport position. Lifting gear 850 includes a frame 852 which is suspended with cables 854. Frame 852 includes at least three cables of which only two cables 856, 858 can be seen in FIG. 8. The third cable is hidden by cable 858. Cable 856 is fixed to the first attachment point 350, cable 858 is fixed to second attachment point 352, and the third cable is fixed to the third attachment point. Furthermore, an active winch 860 for cable 858 is provided on frame 852. A similar winch for the third cable is provided but is not shown in FIG. 8. In the embodiment shown in FIG. 8, no winch for first cable 856 is provided. However, in further embodiments, frame 852 includes also an active winch for first cable 856. The active winches enable lengthening and/or shortening of the cables attached thereto. Furthermore, the winches can be controlled independently so that each cable can be adjusted to an individual length. For example, the different lengths may be utilized for compensating mass imbalances of the transport assembly.

In a next step 808, the lifting appliance 850 is used to lift the transport assembly from the ground. Furthermore, the cables attached to the lateral stabilization elements are lengthened using the winches. Thus, transport frame 300 is rotated about 90 degrees about a horizontal axis. In next step 810, transport frame 300 is in the transport position with the rotor axis of the nacelle/rotor hub unit being oriented substantially vertical. In this upright transport position, the required space of the nacelle/rotor hub unit may be less compared to the horizontal position of the nacelle/rotor hub unit shown in step 804. Thus, the nacelle/rotor hub unit may require less loading area on a vehicle and can be transported by smaller vehicles. Typically, vehicles adapted for transport particularly include, but are not limited to, ships or other vessels. Also, larger vehicles may transport a greater number of nacelle/rotor hub units within the same loading area. Thus, the transport costs can be considerably lowered compared to cases in which the nacelle and rotor hub are transported in horizontal position or even transported separately from each other. In an optional step, the transport assembly may be transported to an intermediate storage where it waits for the final transport to the erection site. Furthermore, rotor blades may be mounted to the rotor at the intermediate storage as described below with reference to step 812.

In an optional step 812, rotor blades 22 are mounted to rotor hub 16 when transport frame 300 is in the transport position. This can be done right after the transport frame has been brought into the transport position or at an intermediate storage to which the transport assembly has been transported. The rotor blades 22 are lifted by lifting appliance 830 and mounted to the rotor hub.

Figure 9:
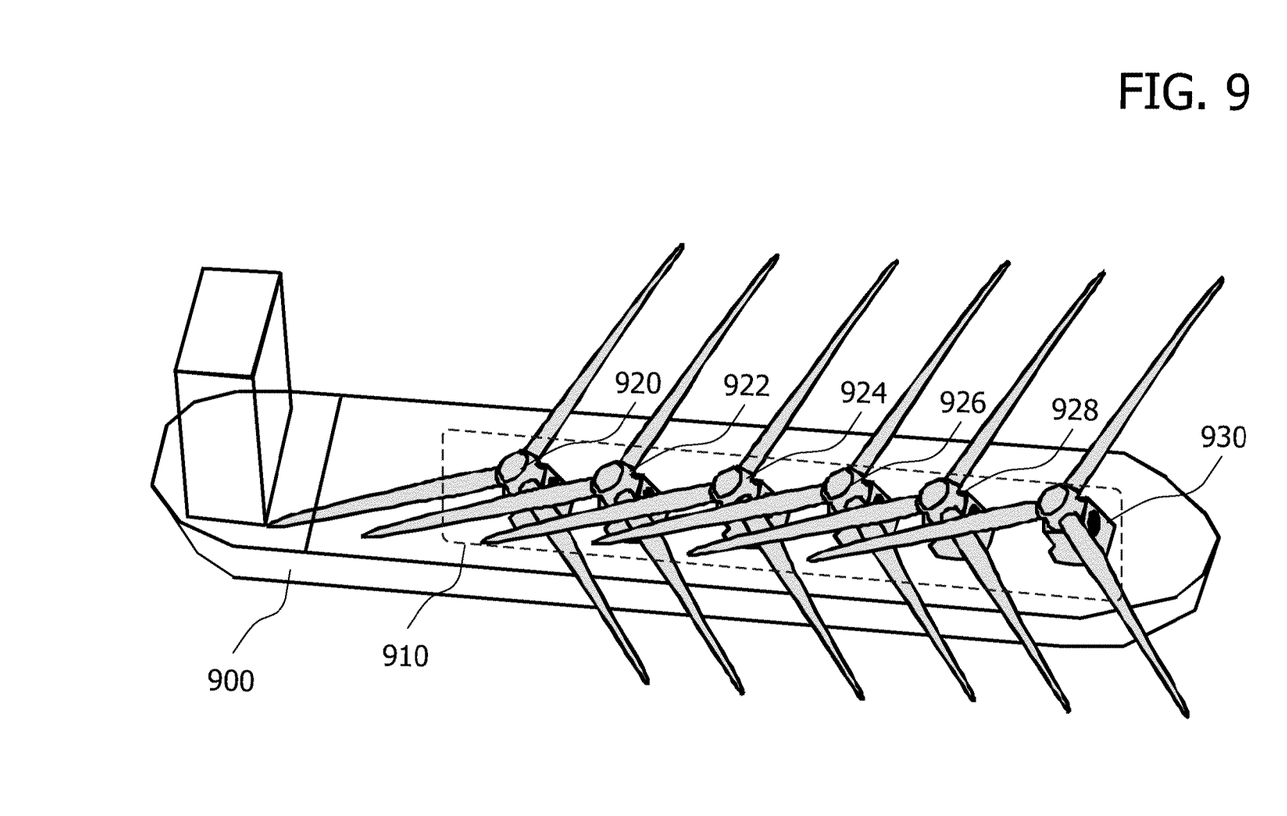
FIG. 9 is a side view of a transport arrangement according to an embodiment described herein.
Figure 10:
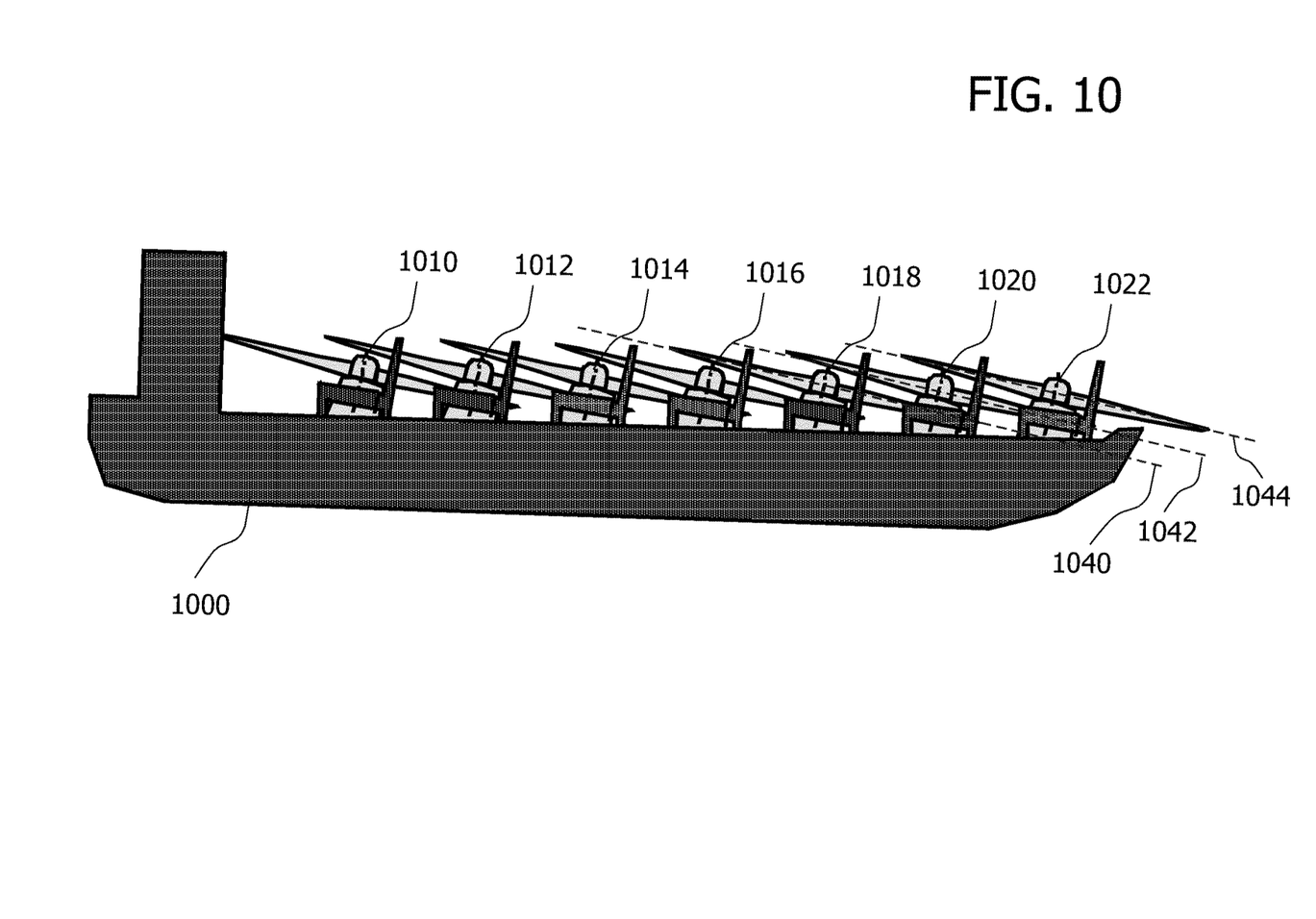
FIG. 10 is a side view of a transport arrangement according to another embodiment described herein.

FIG. 9 is a side view of a transport arrangement according to another embodiment. Therein, seven nacelle/rotor hub units 1010-1022 are transported on vessel 1000. The nacelle/rotor hub units 1010-1022 are mounted to the transport frames such that their respective rotor blade planes are tilted with respect to the loading floor. The rotor blade planes 1040, 1042, 1044 of nacelle/rotor hub units 1018, 1020, 1022 are shown exemplary. As shown in FIG. 10, the tilt of the rotor blade planes 1040, 1042, 1044 allows stacking of the rotors and, as a result, the nacelle/rotor hub units can be placed more closely together. Thus, more units can be transported on the same vessel compared to transporting the nacelle/rotor hub units in horizontal position or with their rotor planes being horizontally aligned.

FIG. 10 shows a side view of a transport arrangement according to another embodiment. Therein, a vessel 1200 carries eight transport assemblies 1210-1224 in their respective transport position. Other than in the embodiment shown in FIG. 9, the rotor blade planes, e.g. rotor blade planes 1240, 1242, 1244 of transport assemblies 1220, 1222, 1224, are not tilted but substantially horizontal in the transport position. However, a loading area 1230 of vessel 1200 has different levels, e.g. like a staircase, on which the transport assemblies are supported. Thus, stacking of the rotor blade planes is enabled without tilting the rotor blade planes.

Figure 11:
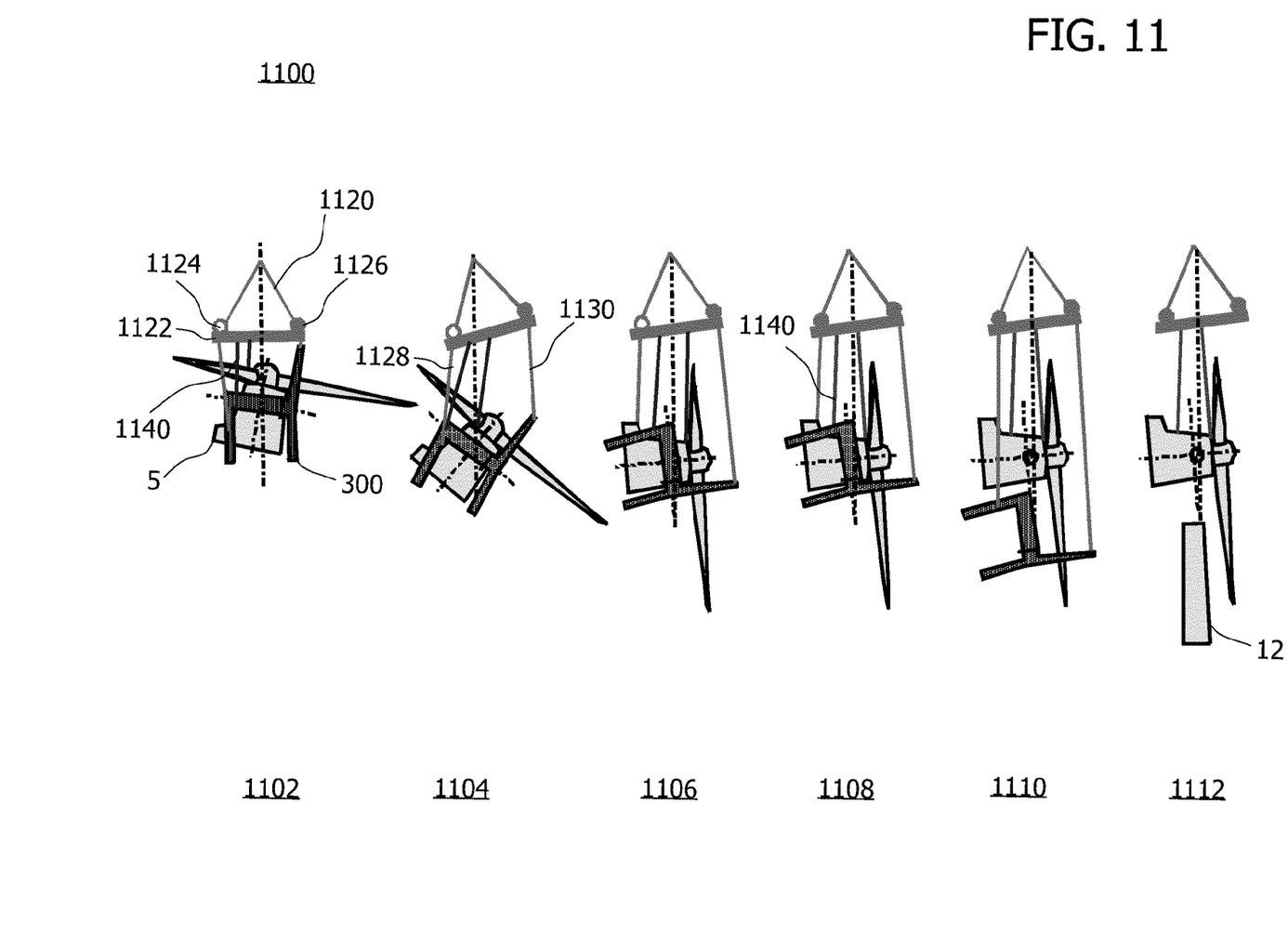
FIG. 11 shows method steps of a mounting method according to an embodiment described herein.

FIG. 11 shows method steps of a mounting method 1100 according to an embodiment. Therein, the transport assembly is lifted from the loading area when arrived at the erection site. For example, the erection site is an offshore wind farm and the transport assembly is transported to the erection site on a vessel. In one embodiment, the transport assembly is moved in a lateral direction after lifting so that it moves away from other transport assemblies transported on the same vehicle. Thus, the risk of damaging the other transport assemblies is reduced. In some embodiments, guide wires are provided for guiding the transport assembly when it is lifted. Thus, the risk of damaging the lifted transport assembly, adjacent transport assemblies and/or other installations is further reduced. The transport assembly is lifted by a lifting appliance 1120 of similar configuration as the lifting appliance 850 described above. Lifting appliance 1120 includes a frame 1122 and active winches 1124, 1126 holding cables 1128, 1130. Cables 1128, 1130 are fixed to the attachment points of transport frame 300. In addition, lifting appliance 1120 includes further cables 1040 which are attached to nacelle/rotor hub unit 5 but not to transport frame 300. Using winches 1124, 1126, nacelle rotor hub unit 5 is rotated about 90 degrees about a horizontal axis so that the main beam is below the unit (steps 1104 to 1108. In a next step 1110, the transport frame is removed from the nacelle/rotor hub unit and lowered down using winches 1124, 1126 while the unit is held by cables 1140. Subsequently, the nacelle/rotor hub unit is lowered onto the top of tower 12 and installed. Thus, the complete nacelle/rotor hub unit with all blades already assembled can be installed in a single process. This results in considerable time saving compared to procedures in which first the nacelle is lifted and installed at the tower top, then the rotor hub is mounted to the nacelle, and finally the blades are lifted and installed one by one.

Exemplary embodiments of devices and methods for transporting a nacelle/rotor hub unit of a wind turbine are described above in detail. The systems and methods are not limited to the specific embodiments described herein, but rather, components of the systems and/or steps of the methods may be utilized independently and separately from other components and/or steps described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A transport frame for a nacelle/rotor hub unit of a wind turbine, wherein the unit comprises a wind turbine nacelle and a wind turbine rotor hub mounted to the nacelle, the transport frame comprising:
a main beam for supporting the weight of the nacelle/rotor hub unit;
first and second lateral stabilization elements;
a holding fixture for fixing the nacelle/rotor hub unit to the transport frame;
a first attachment point for a lifting appliance, the first attachment point being provided at a first end of the main beam;
a second attachment point for the lifting appliance, the second attachment point being provided at the first lateral stabilization element; and
a third attachment point for the lifting appliance, the third attachment point being provided at the second lateral stabilization element.

2. The transport frame according to claim 1, wherein the main beam and the first and second lateral stabilization elements define at least three support points when the transport frame is in a loading position in which the main beam is oriented substantially parallel to the ground.

3. The transport frame according to claim 1, wherein the main beam and the first and second lateral stabilization elements define at least three support points when the transport frame is in a transport position in which the main beam is oriented substantially perpendicular to the ground.

4. The transport frame according to claim 3, wherein the nacelle/rotor hub unit is in an upright position with its rotor axis being substantially vertical when the transport frame is in the transport position.

5. The transport frame according to claim 4, wherein a rotor blade plane of the nacelle/rotor hub unit is tilted with respect to the ground when the nacelle/rotor hub unit is mounted to the transport frame and the transport frame is in the transport position.

6. The transport frame according to claim 1, wherein the holding fixture connects to a machine frame of the nacelle on or around a yaw system of the nacelle, the attachment points are arranged such that they are positioned around the center of gravity in any position of the transport frame, the transport frame comprises at least three contact points to the ground in any position of the transport frame, wherein the at least three contact points are arranged such that they are positioned around the center of gravity in any position of the transport frame; and wherein the main beam and the first and second stabilization elements are formed such that they do not interfere with the nacelle/rotor hub unit mounted thereto and the lifting appliance attached thereto.

7. The transport frame according to claim 5, wherein the holding fixture is angled with respect to the main beam so that the rotor blade plane of the nacelle/rotor hub unit is tilted with respect to the ground when the nacelle/rotor hub unit is mounted to the holding fixture.

8. The transport frame according to claim 1, wherein the holding fixture comprises at least one snap-on joint or at least one quick-release joint.

9. The transport frame according to claim 1, wherein the holding fixture includes a flat flange.

10. The transport frame according to claim 1, wherein at least one of the lateral stabilization elements comprises a first section joined to the main beam and extending generally perpendicular to the main beam and, together with the main beam, defining a plane, a second section extending generally perpendicular to the main beam and the plane, and a third section extending generally parallel to main beam in a plane parallel to the plane defined by the main beam and the first section.

11. The transport frame according to claim 1, wherein the holding fixture is provided at the main beam.

12. The transport frame according to claim 11, wherein the holding fixture is provided at a location of the main beam where the first and second lateral stabilization elements are joined to the main beam.

13. The transport frame according to claim 11, wherein the holding fixture comprises a protrusion insertable into a yaw bearing opening of the nacelle/rotor hub unit.

14. The transport frame according to claim 11, wherein the holding fixture comprises a ring surrounding a yaw bearing of the nacelle/rotor hub unit, the ring being attachable to the yaw bearing.

15. The transport frame according to claim 1, wherein the holding fixture comprises a first mounting part provided at the first lateral stabilization element and a second mounting part provided at the second lateral stabilization element, and wherein the first and second mounting parts are attachable to the nacelle/rotor hub unit.

\* \* \* \* \*